May 14, 1929.  E. A. GUSTAFSON  1,712,955
SPEEDOMETER DRIVE REDUCER
Filed June 5, 1926   2 Sheets-Sheet 1

Inventor
Edwin A. Gustafson
By Blackmore, Spencer & Flint
Attorneys

May 14, 1929.  E. A. GUSTAFSON  1,712,955
SPEEDOMETER DRIVE REDUCER
Filed June 5, 1926  2 Sheets-Sheet 2
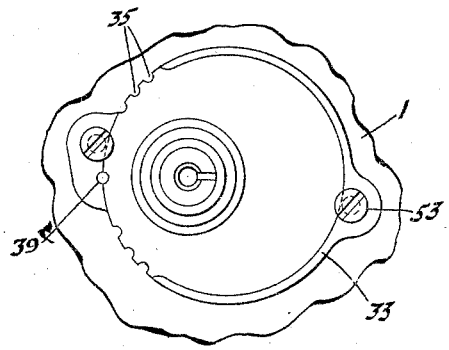
Fig. 3
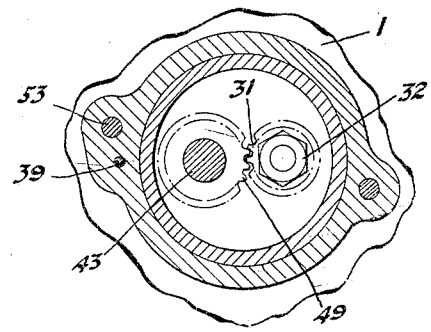
Fig. 4
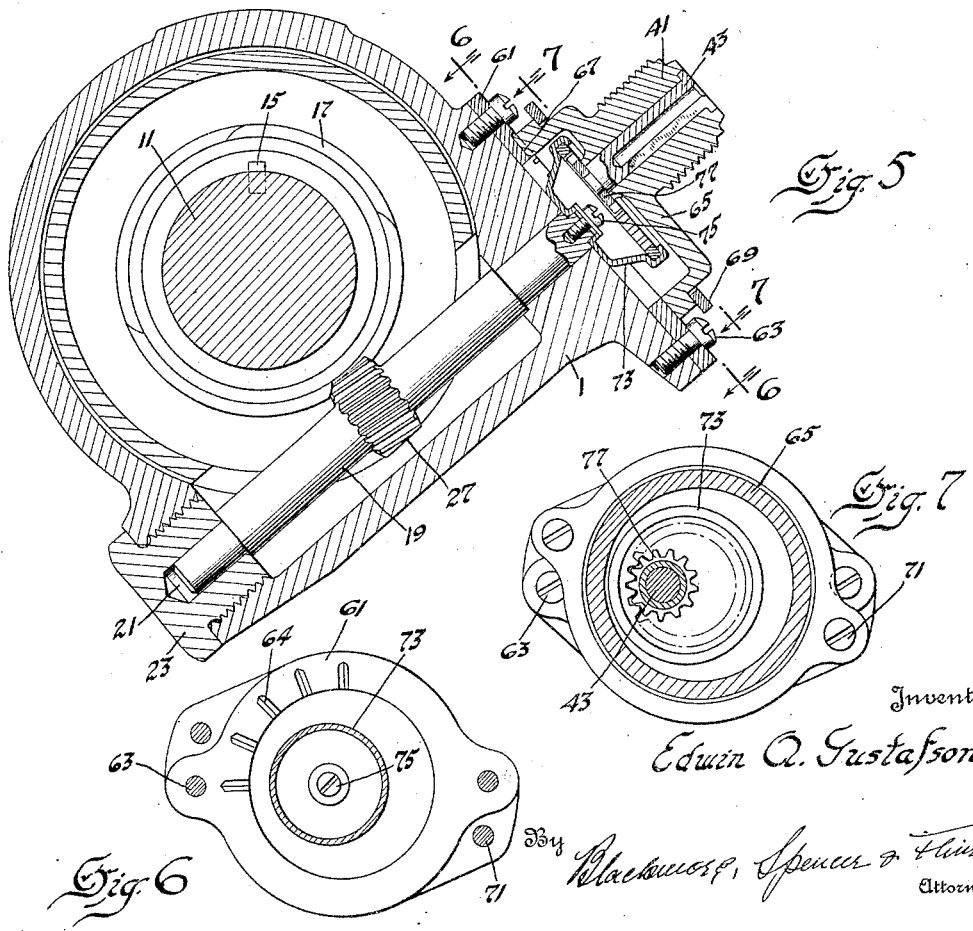
Inventor
Edwin A. Gustafson
By Blackmore, Spencer & Flint
Attorneys Patented May 14, 1929.

1,712,955

UNITED STATES PATENT OFFICE.

EDWIN A. GUSTAFSON, OF FLINT, MICHIGAN, ASSIGNOR TO A C SPARK PLUG COMPANY, OF FLINT, MICHIGAN, A COMPANY OF MICHIGAN.

SPEEDOMETER-DRIVE REDUCER.

Application filed June 5, 1926. Serial No. 113,897.

This invention relates to transmission mechanism and, in its broader aspects, is intended to afford convenient means for securing a plurality of driving ratios between a driving and a driven member.

The expedient is herein shown as applied to a driving connection between a shaft taking off power from the conventional transmission of a motor vehicle and the flexible drive shaft for operating the speedometer. It will be understood, however, that the invention has utility in other relations. It frequently happens that the gear ratio between the transmission shaft and the speedometer shaft must be corrected, owing to changes which have been made in the sizes of tires or in the rear end driving ratio. In the case of some trucks, several different sizes of tires are used, as are also a number of different gear ratios. To accommodate these differences it has been necessary to provide means for changing the gear ratio between driving shaft and the flexible speedometer shaft.

Among the objects of the present invention the primary purpose is to secure in compact assembly a structure for making use of plural gear ratios between a driving shaft and a driven shaft. A second object is to so construct a secondary gear housing as to permit a substitution of gears with the attainment of varying gear ratios. Other advantages and objects will be obvious upon a reading of the following specification and an examination of the accompanying drawing.

In the drawing:

Figure 3 is a plan view of a part of a device.

Figure 4 is a section on line 4—4 of Figure 1.

Figure 5 is a view similar to Figure 1 but showing modified form.

Figure 6 is a section on line 6—6 of Figure 5.

Figure 7 is a section on line 7—7 of Figure 5.

Figures 1, 2:
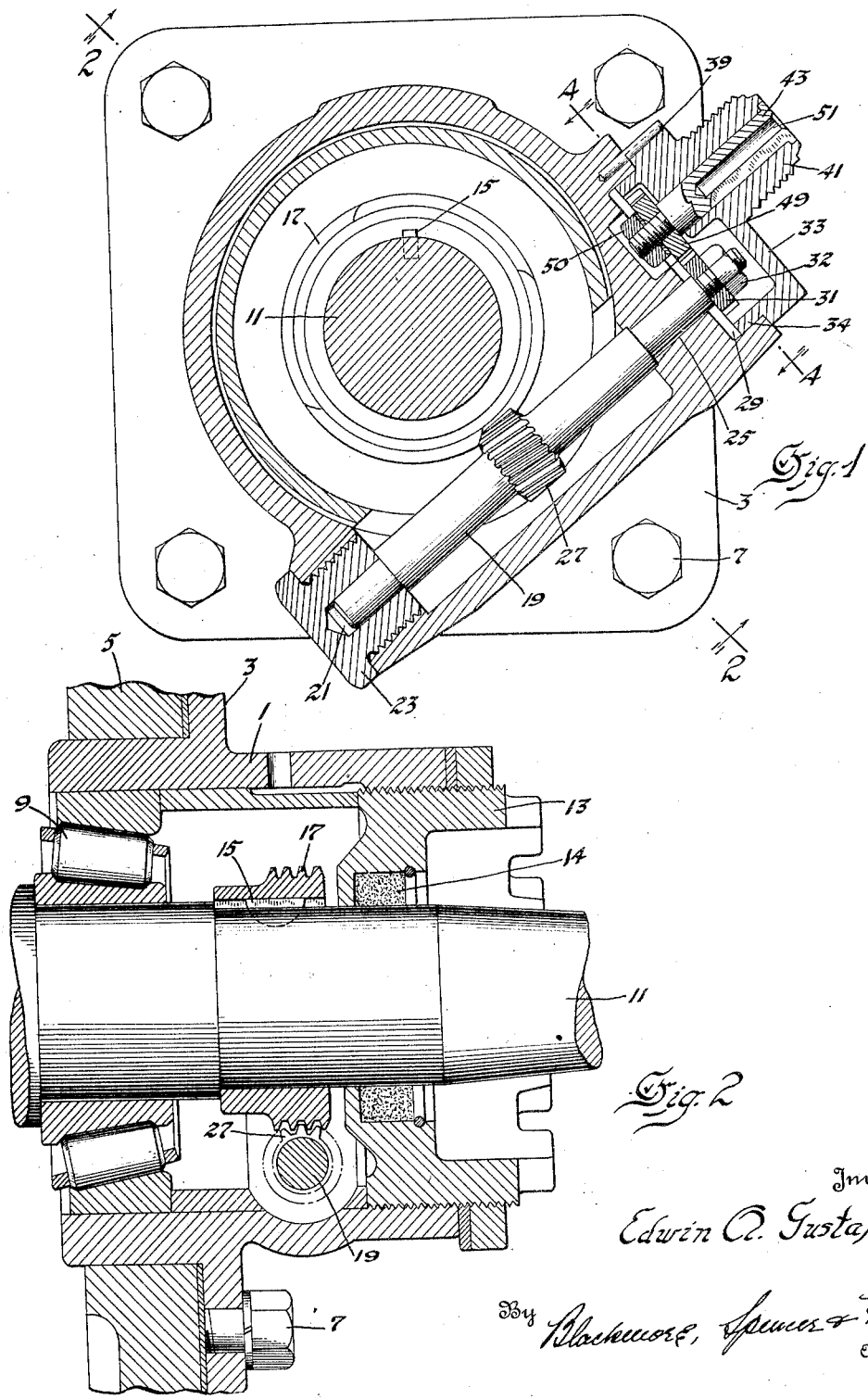
Figure 1 is a transverse section through a supplemental transmission housing showing my invention applied.
Figure 2 is a section on line 2—2 of Figure 1.

Referring by reference characters to the drawing, numeral 1 is a supplemental housing of somewhat tubular shape. It has a flange 3 by which it is secured to the transmission housing 5 with the aid of fastening means 7. Within the supplemental housing 1 is a bearing 9 rotatably supporting the drive shaft 11 which extends from the transmission housing. At its other end the supplemental housing 1 is provided with a closure 13 carrying packing 14 around its central opening through which passes the shaft 11. Between the bearing 9 and the closure 13 there is keyed, as at 15, to shaft 11 a driving gear 17. This driving gear 17 is intended to serve as a means for driving the flexible shaft on the speedometer.

Extended transversely across said supplemental housing at one side of shaft 11 is a driven shaft 19. One end of shaft 19 is reduced and has a bearing in a recess 21 in a plug 23 which is threaded into the supplemental housing. The other end of shaft 19 is also reduced and rotates in an opening provided therefor in the tubular member as shown at 25. Within the supplemental housing member the shaft 19 is provided with a driven gear 27.

In the vicinity of the end of shaft 19 the member 1 is formed with a relatively large circular recess 29, this recess to serve as a gear housing. The shaft 19 extends eccentrically into the recess, and upon its outer end is provided with a pinion 31. A nut 32 is used to hold the pinion in place.

A cover 33, circular in form, has a slightly reduced part 34 extending into recess 29 and may be rotated about the common axis of the recess and cover. To secure the cover in adjusted position its outer periphery is provided with a plurality of irregular spaced semi-circular grooves 35, any one of which may be placed in registration with a circular pin 39 in part 1.

The cover has an upstanding threaded sleeve portion 41 to which is to be connected the flexible housing of an ordinary speedometer shaft. Extending through said part 41 is a shaft 43. It will also be seen that shaft 43 enters the recess 29 in an eccentric position relative to the common center of the recess and cover, and that it is provided with a gear 49 which meshes with pinion 31. The gear may be held in place by a nut 50. The shaft 43 has a suitable opening 51 to receive connecting means carried by the flexible speedometer shaft whereby the shaft 43 is enabled to drive and operate the speedometer. A pair of screws 53 are threaded into part 1 and engage the edge of cover 33 to secure it in position.

It is the purpose of the invention to provide different gear ratios between the shaft 19 and shaft 43. To that end gears of different sizes may be substituted for gear 49, each of which is to be in driving engagement with pinion 31. The relative rotation of cover 33 and the eccentric positions of shafts 19 and 43 have been arranged to render such substitution possible. Since the position of shaft 19 is fixed and is eccentric relative to the common center of the housing and cover, and since shaft 43 is rotatable about the common center, it will be seen that by rotating the cover an opportunity is afforded for substituting gears of various sizes in place of gear 49 with a consequent change in driving ratio between the shafts. There is in this way secured to plurality of definite positions of the cover and housing for each of the plurality of gear sets. To make the change in the driving ratio to accommodate the change in sizes of tires or other parts it is merely necessary to substitute for gear 49 a gear of suitable size, to rotate the cover 33 to its proper position and to thereafter secure the cover in position.

In Figures 4 and 5 is shown a slight modification of the structure illustrated in Figures 1 to 3. In this figure the shaft 11 and shaft 19 are mounted just as in the form already described. In this modified form the supplemental housing is formed partly by an annular member 61 secured by fastening means 63 to the supplemental housing 1, and by the cup shaped member 65. The annular member 61 has a number of notches 64, any one of which is engageable with the lug 67, on the lower edge of the cup 65. A ring 69 engages the shoulder near the lower edge of the cup and through this ring screws 71 may be inserted to engage in the housing member 1.

Within the supplemental housing the end of shaft 19 is provided with an annular ring gear member 73, the gear member being held by a screw 75. Engaging with said gear member 73 is a driven pinion 77 secured to the inner end of driven shaft 43. In this case, as in that already described, when the cup shaped member 65 is rotated about the common axis of the recess and cover provision is afforded for the substitution of other gears in place of gear 77 to thereby change the driving ratio between ring gear 73 and driven pinion 77.

In each of the two forms shown a very convenient arrangement has been provided by which the gear ratio for driving the speedometer shaft may be readily changed. In each case it is merely necessary to remove a cover member, substitute one gear for another and turn the cover to a suitable position of adjustment.

I claim:

1. A power transmission mechanism comprising a gear housing, a cover therefor, a shaft eccentrically journaled in said housing, a second shaft eccentrically journaled in said cover, said cover and housing being relatively rotatable about their common center, and interchangeable gearing between said shafts within said housing.

2. A power transmission device comprising a casing and a concentric cover of equal radius therefor, the casing and cover being arranged for adjustment circumferentially about their common center, a shaft eccentrically mounted in the casing, a second shaft eccentrically mounted in the cover, gearing elements engaging each other within the casing and secured to the shafts, the adjustment of the casing and cover permitting substitution of gear elements and change of gear ratios.

3. A casing having an internal gear mounted eccentrically therein, a cooperating concentric cover member of like radius having a spur pinion mounted eccentrically therein, the casing and cover being relatively rotatable about their common center and having inter engaging parts to hold them in a plurality of circumferentially spaced positions corresponding to the engagement of the internal gear with the plurality of pinions, the gear and the pinion being mounted on shafts rotatable in their respective casing elements.

4. In a transmission device, a cup and a concentric cover, shafts eccentrically positioned in each, said cup and cover being relatively rotatable about their common center, one of said shafts having a gear within the cup, means to secure the cup and cover in a plurality of circumferentially adjusted positions, each positioned determining the engagement of a definitely selected pinion on one shaft with the gear on the other shaft.

In testimony whereof I affix my signature.

EDWIN A. GUSTAFSON.